United States Patent [19]

Dyczynski

[11] 3,750,863
[45] Aug. 7, 1973

[54] SEGMENTAL SELF-SUPPORTING BEAMS CONVEYOR AND COMBINATION BED AND CONVEYOR

[75] Inventor: Karol T. Dyczynski, Erie, Pa.

[73] Assignee: Hanley Development Corporation, Erie, Pa.

[22] Filed: Mar. 22, 1972

[21] Appl. No.: 237,119

[52] U.S. Cl. .................................. 198/189, 5/81 R
[51] Int. Cl. ........................ A61g 7/08, B65g 15/30
[58] Field of Search ........................... 198/189, 195; 5/81 R

[56] References Cited
UNITED STATES PATENTS
2,593,324  4/1952  Mann ................................ 198/195

Primary Examiner—Edward A. Sroka
Attorney—Charles L. Lovercheck

[57] ABSTRACT

A conveyor and a conveyor in combination with an invalid bed. The conveyor is made up of a continuous belt supported on two spaced pulleys. The pulleys have an outside periphery in the shape of a polygon, rotatable about a central axis and having flattened surfaces around the periphery, each flattened surface being equal in length to one side of the polygon. The belt is made up of hinged sections, hinged together by links. Each link is pivoted at its ends to the ends of two adjacent sections and each section has teeth arranged in a circle having a center at the pivot point of the links. The teeth mesh with each other as the sections pass around the pulleys so that the sections are held in positive alignment with each other. The links are arranged to form a continuous belt that passes around the pulleys and each section is equal to one side of the polygonal surfaces of the pulleys. Each section has a pad on it that forms a bed mattress to support an invalid and the pulleys are supported on the head and foot of the bed.

6 Claims, 11 Drawing Figures

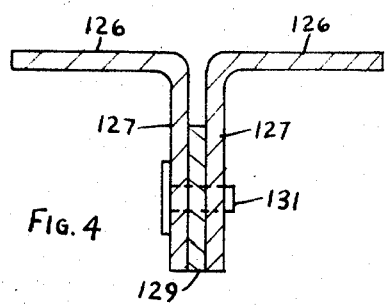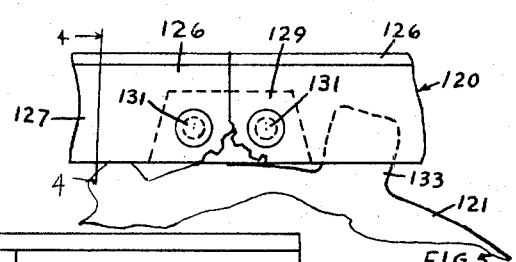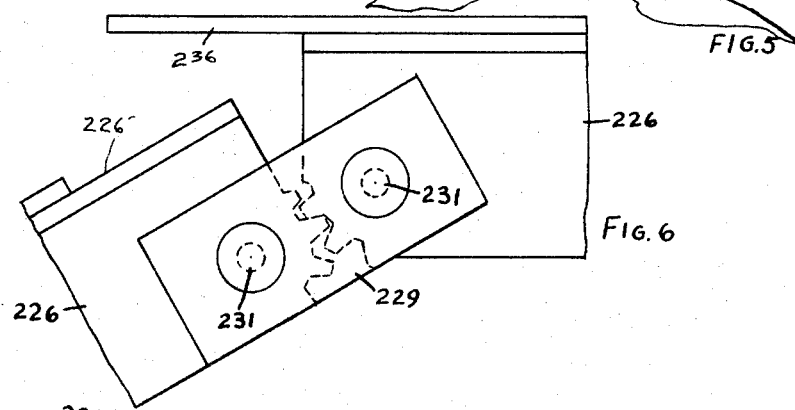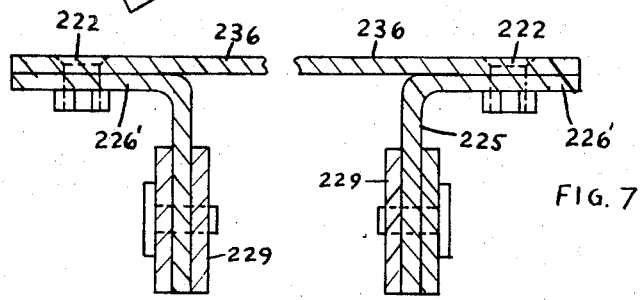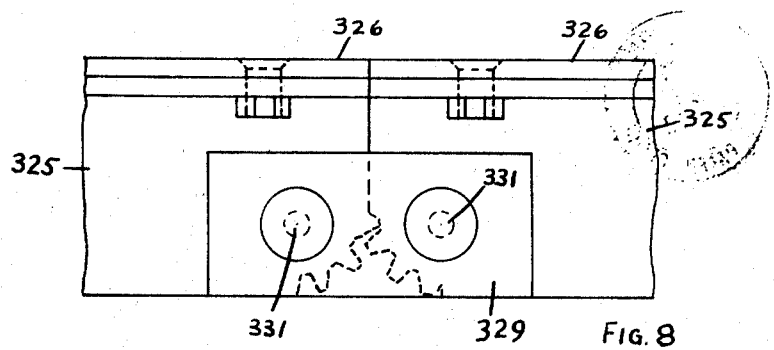

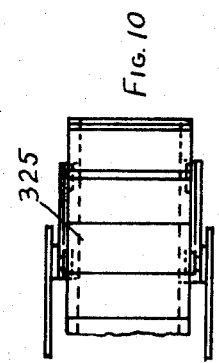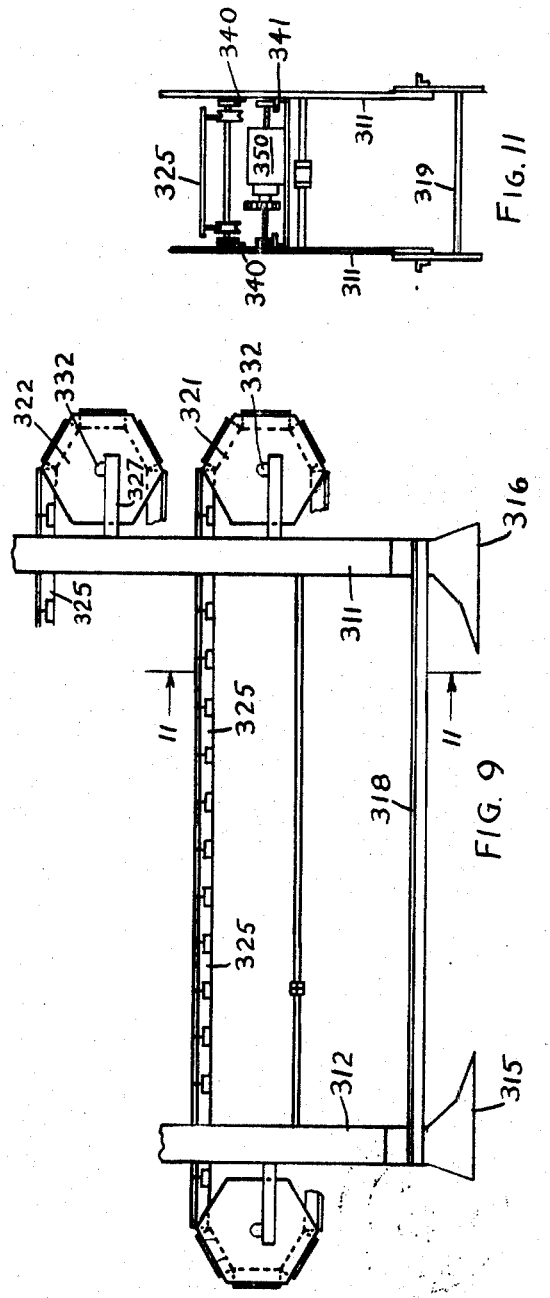

3,750,863

SEGMENTAL SELF-SUPPORTING BEAMS CONVEYOR AND COMBINATION BED AND CONVEYOR

OBJECTS OF THE INVENTION

It is an object of the invention to provide an improved conveyor wherein the conveyor is made up of sections which form a bed.

Another object of the invention is to provide an improved invalid bed.

Yet another object of the invention is to provide an improved conveyor structure.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 4 is an enlarged partial view of one part of the device according to the invention.

FIG. 5 is an enlarged cross sectional view showing a partial view of a side view of the part shown in FIG. 4.

FIG. 6 is a side view of another embodiment of the invention.

FIG. 7 is a longitudinal cross sectional view similar to FIG. 4 of one embodiment of the invention.

FIG. 8 is a side view of yet another embodiment of the invention.

FIG. 9 is a partial side view of another embodiment of the invention.

FIG. 10 is a partial top view of the embodiment shown in FIG. 9.

FIG. 11 is a cross sectional view taken on line 11—11 of FIG. 9.

DETAILED DESCRIPTION OF THE DRAWINGS

Figure 2:
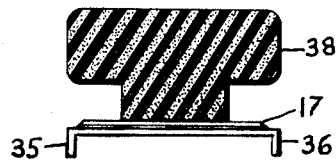
FIG. 2 is a longitudinal cross sectional view taken on line 2—2 of FIG. 1.
Figure 1:
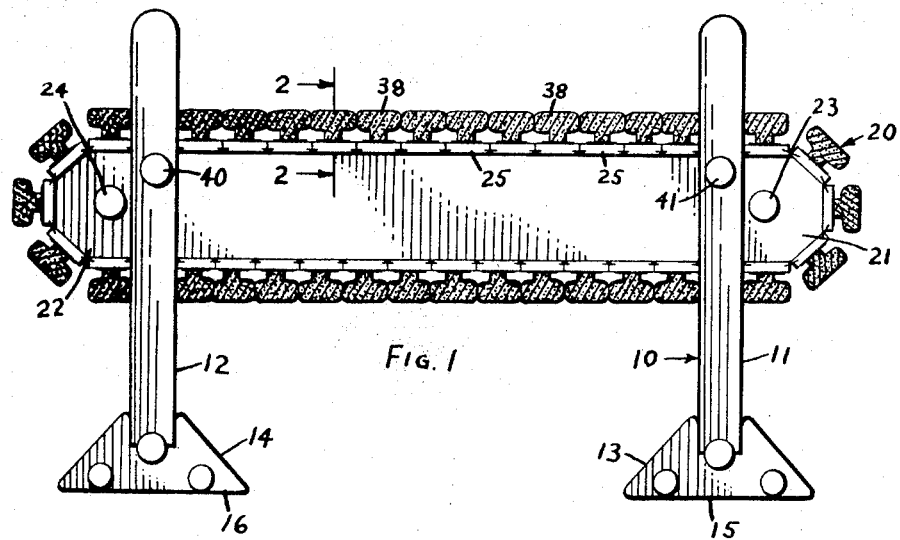
FIG. 1 is a side view of a bed according to the invention.

Now with more particular reference to the drawings, the bed 10 is shown having spaced first bed posts 11 and spaced second bed posts 12 that are also longitudinally spaced from each other and, like bed posts, are supported laterally spaced from each other. The bed posts have bases 13 and 14 that are supported on a floor at 15 and 16 in the usual manner. The bed posts support the conveyor 20. The conveyor 20 is supported on the longitudinally spaced pulleys 21 and 22 that are carried by the bed posts on the axles 23 and 24. The axles are supported on suitable bearings carried on the support members 40 and 41. The pulleys are rotatable about their centers 23 and 24 and the outside periphery of the pulleys is in the shape of a polygon, each polygonal side of a pulley surface has a length equal to the length of one of the conveyor sections 25. Each section 25 has a flange 26 and a web 27. The webs are pivoted together at the points 30 and 31 by means of the links 29 and each of the spaced flanges is connected together by a plate that extends from the flange of a section at one side of the bed indicated at 35 to the flange of a section at the other side indicated at 36. The plates 17 each have a pad 38 supported to its top and the pad 38 acts as a mattress to support a patient.

The teeth 32 and 33 are formed on the lower corners of the sections. The teeth are disposed in an arcuate path having a center at the pivot points 31 and 30, pivoting the links 29 to the webs 27.

The axles 23 and 24 may be driven by a suitable motor so that a patient on the bed may be transferred from the bed to a suitable carrier to transport the patient from place to place in a hospital or the like.

Figure 3:
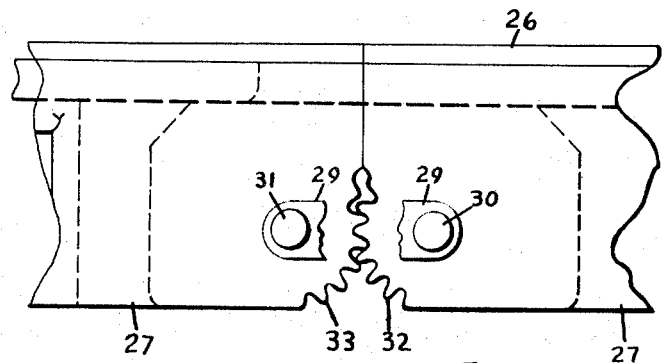
FIG. 3 is an enlarged partial side view of two of the hinged conveyor sections with the padding removed.

In the embodiment of the invention shown in FIGS. 4 and 5, a single sprocket 121 is shown, which may be one of a pair of spaced sprockets supported in spaced relation to each other. The single sprocket has the belt 120 supported on it. The belt 120 is made up of sections 126 which are connected together by links 129 pivoted to the belt by pins 131. The sprocket has teeth 133 that extend up between the laterally spaced legs 127 and rotate the belt. The belt is made up of spaced angular sections 126 that have a vertical portion and a laterally disposed portion 126 which forms a top surface on the belt. Conveyor sections 126 are connected together by links 129 which are similar to links 29 in FIG. 3.

In the embodiment of the invention shown in FIGS. 6 and 7, the belt is made up of spaced sections 226 that have angular cross sections which are connected together by the links 229 which are pivoted to the sections 226 by pins 231. The links have plates 236 attached to the horizontal parts of the sections by means of studs 222. The plates 236 overlap the joints between the sections 226, as indicated in FIG. 6.

The embodiment of the invention shown in FIG. 8 is much like the embodiment shown in FIG. 7 but instead of having the sections 326 overlap the joints between the sections, the plates 326 terminate at the joints between the sections. Links 329 connect the conveyor links 325 together by means of pins 321. Links 329 are similar to links 29 in FIG. 3.

In the embodiment of the invention shown in FIG. 9, we show the spaced supports 311 and 312 which have bases 315 and 316 to be supported on a floor. The bases are held together by a suitable brace 318 and cross brace 319. A conveyor having sections 325 is supported on the spaced pulleys 321. A second conveyor 322 may be supported in vertically spaced relation above the lower conveyor sections 325. The upper conveyor is carried by sprockets 322. The top surface of the conveyor sections 325 is flat, as indicated in FIG. 10. The axles 332 are supported on frame members 327 which are fixed to the supports 311 and 312. The conveyor may be used in stacked relation for a variety of purposes familiar to those skilled in the art. The conveyor sections 325 may be carried on angle tracks 340 and 341, both above and below the axles 332 and a drive member for driving the sprockets 321 and 322 is indicated at 350.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A continuous conveyor belt made up of a plurality of laterally spaced pairs of sections,
   each section having a web portion abutting the end of a web portion of an adjacent section,
   said sections being of substantial depth,
   each section having a link pivotally connected to an adjacent section at a spaced position below the center line of said section,
   and teeth formed on the lower corners of each adjacent section,
   said teeth being arranged in a circle so the center is at the said pivot to said link whereby said teeth mesh with each other and hold said sections in parallel relation to each other.

2. The conveyor recited in claim 1 wherein said belt is supported on two spaced pulleys,
   said pulleys having polygonal peripheral surfaces engaging said sections,
   each said polygonal surface being equal to the length of one said section.

3. The conveyor recited in claim 1 wherein a plate is supported on the top of each two laterally spaced sections providing a continuous top surface for said conveyor.

4. The conveyor recited in claim 3 wherein a pad is supported on each said plate, providing a bed for an invalid.

5. The conveyor recited in claim 1 wherein two said continuous conveyor belts are supported one above the other on said supports.

6. The conveyor recited in claim 1 wherein said plates overlap two adjacent said spaced sections.

* * * * *